United States Patent [19]

Tammera et al.

[11] Patent Number: 5,413,705

[45] Date of Patent: May 9, 1995

[54] FILTERLESS DRAIN SEPARATOR

[76] Inventors: Robert F. Tammera, 56 Gilbert Pl., West Orange, N.J. 07052; Robert J. Dallara, 75 Hawthorne Ter., Leonia, N.J. 07605

[21] Appl. No.: 950,926

[22] Filed: Sep. 24, 1992

[51] Int. Cl.⁶ .............................................. B01D 21/00
[52] U.S. Cl. ........................ 210/94; 4/222.1; 4/292; 4/650; 4/681; 210/163; 210/304; 210/435
[58] Field of Search ................ 210/94, 163, 232, 304, 210/459, 512.1, 532.1, 162, 154, 435, 446, 447, 916; 4/279, 280, 281, 679, 681, 286–293, DIG. 14; 137/247.11, 247.31, 247.35, 247.39, 546

[56] References Cited

U.S. PATENT DOCUMENTS

| | | | |
|---|---|---|---|
| 97,160 | 11/1869 | Burleigh | 210/447 |
| 135,222 | 1/1873 | Huerne | 210/435 |
| 210,196 | 11/1878 | Frisbie | 137/247.39 |
| 770,129 | 9/1904 | Tilden | 137/247.31 |
| 858,306 | 6/1907 | Pleins | 137/247.11 |
| 989,965 | 4/1911 | Harloe | 210/94 |
| 1,503,118 | 7/1924 | De Leeuw | 210/447 |
| 1,817,376 | 8/1931 | Izquierdo | 210/447 |
| 1,896,310 | 12/1929 | Hildebrand | 210/438 |
| 2,166,279 | 7/1939 | Barwick | 210/532.1 |
| 4,224,701 | 9/1980 | Huang | 4/679 |
| 4,949,406 | 8/1990 | Canelli | 4/679 |

FOREIGN PATENT DOCUMENTS 111509  11/1917  United Kingdom ............. 210/512.1

*Primary Examiner*—Joseph W. Drodge
*Attorney, Agent, or Firm*—Weingram & Zall

[57] ABSTRACT

A retrofittable filterless drain separator has an outer housing with a spherical section and an inner holding area including an inner spherical segment which is positioned and spaced apart from the spherical section of the outer housing. The separator includes vane in an inlet portion thereof which serves to direct passing liquids against an inner spherical centripetal separator so that the flow path of all liquids together with any entrained solids in the flow path is directed along a curved path which forces separation of particulate material from the liquid. A passage in the centripetal separator section allows liquid to pass through and out of the drain while retaining the solid or particulate matter in the centripetal separator. A component allowing access disposed in the spherical section of the outer housing permits easy access to the internal surface of the centripetal separator to facilitate the removal of any entrapped solid or particulate matter. The difference in the diameters between the outer spherical section and the inner centripetal section provides an emergency flow path for any liquid should the outlet aperture of the centripetal separator become clogged.

32 Claims, 2 Drawing Sheets

FILTERLESS DRAIN SEPARATOR

BACKGROUND OF THE INVENTION

1. Field of the Invention

The present invention relates to a filterless drain separator. More particularly, the present invention relates to a filterless drain separator which is capable of being retrofitted into existing drains for sinks commonly employed in residential and industrial applications.

2. Description of the Prior Art

Typical of the prior art encountered in this field are the following U.S. Patents:

Thomas, U.S. Pat. No. 286,746, discloses a waste trap comprised of inlet and outlet pipes, a cup, a partition or baffle and a drain plug. The advantage of this invention is that the cup, the inlet pipe, and the partition can all be cast as one piece in a metallic mold. The elements of this disclosure are not similar to the present invention.

Dellinger, U.S. Pat. No. 473,062, discloses a plumber's trap which can be inserted directly into a drain line. The trap comprises upper and lower semihemispherical portions, both formed as single parts and then joined together at their circumference. Waste liquid enters the inlet of the upper hemisphere and then fills the lower hemisphere until the liquid overflows into the outlet drain incorporated into the lower hemisphere. A vent is incorporated into the upper hemisphere and a drain plug is provided at the bottom of the lower hemisphere. The elements of this disclosure are not similar to the present invention.

Horgan, U.S. Pat. No. 483,961, discloses a trap for urinal bowls comprising a circular inlet chamber whose upper inlet connects to the urinal bowl drain, a drain plug for draining and cleaning the inlet chamber; and an outlet chamber extending centrally from side to side of the inlet chamber and whose one end connects to the drain pipe. The outlet chamber contains a partition or baffle which directs the incoming waste liquid into the bottom portion of the circular chamber until the liquid rises to the top edge of the outlet chamber at which point it overflows into the drain pipe. This arrangement provides a water seal to seal out noxious gases. This trap requires an L-shaped drain pipe configuration. The elements of this disclosure are not similar to the present invention.

Stanford, U.S. Pat. No. 616,025, discloses a liquid sealed trap designed to be used as a "running-trap, S-trap, a P-trap, etc." This trap comprises a cylindrical body with removable caps at each end, an inlet and an opposing outlet. The top of the inlet is at the same level as the bottom of the outlet. The inlet and outlet are placed at a forty five degree angle to the cylindrical body so that when angled elbow drain pipes are connected to the inlet or outlet, any of the desired trap arrangements can be formed. The cylinder contains a partition or baffle which forms an open bottom compartment which when filled with liquid creates a liquid seal between the inlet and outlet and prevents noxious gases from escaping. In operation, waste water flows into the inlet, fills the cylindrical chamber to the bottom of the outlet and then overflows into the drain pipe connected to the outlet. The elements of this disclosure are not similar to the present invention.

Evans, U.S. Pat. No. 667,303, discloses a waste liquid trap comprised of an elongated casting designed to be mounted and hidden within a wall partition. This casting has two side outlets, the topmost outlet being connected to the inlet waste drain, and the lower outlet being capped with a threaded plug which can be removed to clean the trap. At the lower end of the elongated cylinder is the drain outlet and at the upper end is a noxious gas vent. Internal to the elongated trap are two U-shaped compartments formed by baffles, one inverted so that its wall extends into the second U-shaped compartment. These compartments form a cup that holds the liquid seal for the trap. The elements of this disclosure are not similar to the present invention.

Riley, U.S. Pat. No. 668,776, discloses a liquid waste plumbers trap containing a double liquid seal to prevent the discharge of noxious gas from the drain line and also to guard against siphoning of the liquid out of the chambers wherein the liquid seal is formed. The trap is formed in a cylindrical shape with internal partitions shaped like a question mark and an inverted question mark, arranged so as to form two liquid sealed chambers within the trap. The elements of this disclosure are not similar to the present invention.

Morrison, U.S. Pat. No. 806,275, discloses a waste liquid trap for bathtubs which connects the outlet drain from the bathtub and the overflow drain from the bathtub to the outlet drain pipe. Internal to this trap are two baffles which direct the flow of liquid from the bathtub drain and overflow drain into a single chamber formed by one of these baffles. This liquid fills this chamber and forms a liquid seal and then overflows the edge of the baffle and drains away through the drain pipe. The elements of this disclosure are not similar to the present invention.

Pleins, U.S. Pat. No. 858,306, discloses a dual liquid sealed plumbing trap designed to guard against siphoning or breaking of the liquid seal. The trap comprises a circular body with an inlet and an outlet, and a multi-compartment interior which directs the waste liquid flow from the inlet pipe through these internal compartments so that two liquid seals are formed before the waste liquid reaches the drain outlet. A threaded cap mounted on the side of the circular trap contains one of the connecting compartments and yet is removable so that the main branches of the trap can be cleaned. The elements of this disclosure are not similar to the present invention.

Parker, et al., U.S. Pat. No. 904,082, discloses a dual-liquid seal trap combined into one fitting which can be installed within a wall partition. The trap has a side inlet that connects to a U-shaped liquid sealed trap compartment, whose outlet communicates to a drain pipe and to a vent pipe. This trap is designed so it can be disconnected from its fixture without spilling the liquid contents of the trap. Two fixtures can independently drain into separate trap compartments, both traps in-turn drain into a common drain pipe. The elements of this disclosure are not similar to the present invention.

Izquierdo, U.S. Pat. No. 1,817,376, discloses a removable strainer for a drain designed to prevent debris from entering and clogging the plumbers trap. This strainer comprises a cylindrical body mounted directly in-line in the drain pipe, a sliding strainer tray that fits snugly within this cylindrical enclosure and a sealing cap with handle. In operation, waste liquid is filtered through this strainer and the debris collects in the strainer. To clean the strainer, the sealing cap handle is manually rotated to unscrew the sealing cap, the cap is removed and then the sliding strainer tray is pulled out and emptied. The strainer tray fits snugly in the drain line and has no provision for the passage of liquid waste once the strainer becomes clogged with debris. This disclosure contains many elements that are similar to the linear strainer separator invention.

Barwick, U.S. Pat. No. 2,166,279, discloses a sink trap with a visible interior. The trap comprises a cap with an inlet and an outlet connection, a transparent sediment container which mates with this cap and a locking bail pivotally mounted on the cap which detachably engages and holds the sediment container to the cap. Waste liquid entering this trap is directed by the inlet pipe to the bottom of the sediment container and creates a swirling motion upon entry. The transparent sediment container allows visual inspection to determine the amount of sediment or whether any foreign objects have entered the container. The elements of this disclosure are not similar to the present invention.

Birnbaum U.S. Pat. No. 2,467,547 discloses a drain trap incorporating a baffle and debris catchall container. This disclosure modifies a standard U-shaped plumbers drain trap by placing a baffle in the waste liquid outlet stream so as to redirect the liquid flow into a catchall container wherein any object or sediment of a specific gravity greater than that of the flowing liquid will separate out and remain in this container. The waste liquid and any material light enough to be carried along by the flow of the liquid waste is forced upward and out of the container and then into the drain outlet. The catchall container is removed from the drain by unscrewing it. The container is made of glass or clear plastic so that any debris collected can be visually checked. This disclosure contains many elements that are similar to the elements of the linear strainer waste separator invention.

Barker et al., U.S. Pat. No. 2,935,992, discloses a flexible trap. This trap comprises two semihemispherical components each having a port that can be clamped onto a drain pipe and each having an internal baffle. When assembled into a single unit, the internal baffles form a torturous passageway which forces the waste liquid into a sump compartment formed by these baffles. The waste liquid then overflows one of the baffles and flows into the drain pipe. The sump compartment restricts the flow of the waste liquid so that any debris will collect in this sump. For debris such as human hair, grit, coffee grinds and the like, these can be purged from the sump compartment by running liquid through the trap while simultaneously squeezing and compressing the sides of the trap. The entire trap must be removed to recover objects that may be lodged in the trap. The elements of this disclosure are not similar to the present invention.

Kessel, U.S. Pat. No. 4,198,717, discloses a modular assembly for a drain trap used to catch drain water from inside or outside a dwelling, especially surface runoff. The trap comprises a modular assembly which can be easily expanded in depth and accessories. The top of the trap can be directly connected to a drain pipe or water spout. In addition, the top can incorporate an open grid so that surface water can drain directly into the trap. In addition to an inlet on the lid, an inlet is also mounted on the upper portion of the side(s). Water from either the top or the side inlets can be directed by a baffle into a catch basket which would screen out pebbles or other solid objects being washed into the trap. Drain water collects at the bottom of the trap container, forms a liquid seal, and then drains out through a baffled outlet. The baffles attached to this outlet form an open-bottomed compartment which when filled with water forms the aforementioned liquid seal. The elements of this disclosure are not similar to the present invention.

Tuleja, U.S. Pat. No. 4,199,827, discloses a U-shaped drain trap wherein various strainers entrap various sized particles and valuable articles which may be in the waste liquid. This drain trap comprises a U-shaped trap with a threaded nut that enables the insertion or removal of the various strainers into the path of the waste liquid. The various embodiments of strainers include variously sized mesh screens mounted along a rod, a cylindrical mesh basket, a cylindrical basket with variously sized internal fingers, and a rod containing a plurality of radially extending pins or wires. All of these screening methods will entrap various sized particles in the waste liquid until the screens become completely clogged. At this point, the threaded nut must be removed so that the screen can be cleaned. This disclosure contains many elements that are similar to the elements of the linear strainer waste separator invention.

Haentzens, U.S. Pat. No. 4,761,235, discloses a waste separator that separates and accumulates solid waste material such as that produced by a household garbage disposal. In this waste separator, the flow of the waste liquid is redirected via a baffle into a waste container. The heavier particles in the waste liquid settle out and remain in the waste container while the waste water eventually drains out through an outlet connected to the drain. By redirecting and reducing the flow velocity of the waste liquid, the separator prevents flush through and allows the waste material to settle out. The elements of this disclosure are not similar to the present invention.

OBJECTS AND SUMMARY OF THE INVENTION

This invention is directed to a novel retrofittable filterless drain separator having an outer housing having a spherical section and an inner holding area including a spherical segment which is positioned and spaced apart from the spherical section of the outer housing. The separator includes a drain means in an inlet portion thereof which serves to direct passing liquids against an inner spherical centripetal separator so that the flow path of all liquids together with any entrained solids in the flow path is directed along a curved path which forces separation of particulate material from the liquid. Passage means in the centripetal separator section allows liquid to pass through and out of the drain while retaining the solid or particulate matter in the centripetal separator. An access means disposed in the spherical section of the outer housing permits easy access to the internal surface of the centripetal separator to facilitate the removal of any entrapped solid or particulate matter. The difference in the diameters between the outer spherical section and the inner centripetal section provides an emergency flow path for any liquid should the outlet aperture of the centripetal separator become clogged.

Accordingly, it is an object of the present invention to provide a centripetal separator which can be readily retrofitted with existing drains without the necessity of replacing the standard drain trap;

It is another object of the present invention to provide a non-filter drain separator which employs the principle of centripetal and/or centrifugal force as a means for separating particulate material from liquids;

It is yet another object of the present invention to provide a drain separator which employs elements of varying size for the purpose of separating particulate material but which permits and provides an emergency overflow channel in the event clogging of the primary separation system occurs;

It is yet another object of the present invention to provide a drain separator having a means of entrapping solid particulate material in such fashion as to encourage an accumulation of debris within the drainage system beyond the zone of the typical sink basin and before the gas trap;

It is another object of the present invention to provide a drain separator having an easy access to facilitate the removal of solids without the need of metal snakes, specialized tools or reliance upon professional services;

It is still another object of the present invention to provide a drain separator which does not require a filter which is capable of functioning without the need of periodic accessing or filter replacement after a long period of use;

It is another object of the invention to provide a drain separator which can be manufactured in clear plastic, so permitting a transparent view to visually inspect the internal condition of the separator;

Another object of the present invention is to provide a drain separator which is easy to construct in design and is able to entrap large items such as vegetation or pieces of paper which would normally clog any conventional screen or filter but will instead permit a path for exit of fluid therefrom until removal of the larger particles is effected;

Another object of the invention is to provide a drain separator which can utilize conventional grinding elements which grind down and comminute any soft items which are entrapped in the separator;

It is another object of the invention to provide a drain separator which incorporates a vane which alters the direction of flow of liquid to separate particulate material contained in the liquid flow of the separator by means of centripetal and/or centrifugal forces; and It is also an object of the present invention to provide a drain separator which enables the placement of deodorizing and/or disinfecting materials into the separator to enhance sanitation standards and to facilitate hygienic conditions in the residential household or commercial site.

It is another object of the present invention to provide a drain separator which incorporates a device which gathers, for easy removal, hair or other stringy material that normally tends to clog drains.

BRIEF DESCRIPTION OF THE DRAWINGS

These and other objects of the present invention will be more readily understood by reference to the accompanying specification and drawings wherein.

DETAILED DESCRIPTION.

Figure 1:
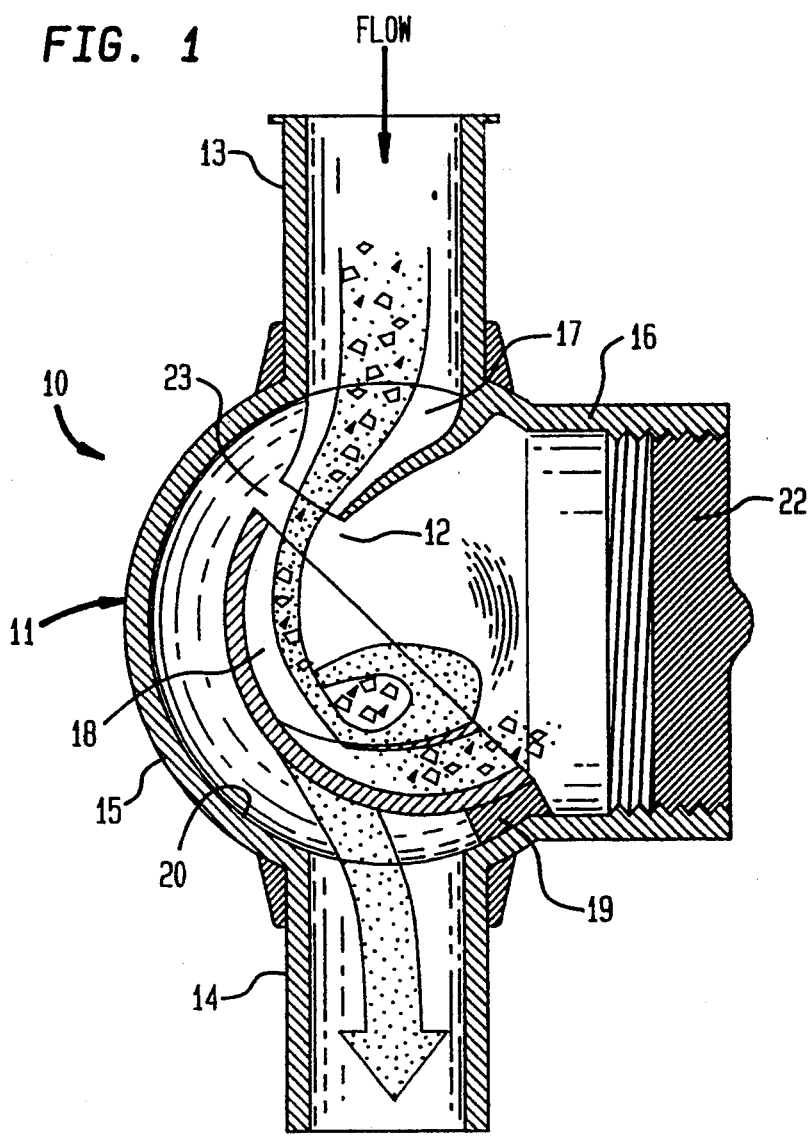
FIG. 1 is a cross-sectional view of the drain separator in accordance with the invention.

With reference now more particularly to FIG. 1, there is shown a cross-sectional view of the drain separator of the invention. Shown is drain separator 10 including an outer housing 11 and an inner holding area 12. Outer housing 11 comprises inlet conduit 13, outlet conduit 14, a spherical section 15, a horizontal cylindrical section 16 intersecting the spherical section 15 and a vane 17 which is capable of coacting with the inlet conduit 13 so as to direct the influx of liquid therefrom. Separator 10 also includes an inner holding area comprising a spherical segment 18 disposed intermediate the inlet and outlet conduits 13 and 14, respectively, a positioning means 19 disposed on spherical segment 18 such that it is positioned in the spherical inner wall portion 20 of the outer housing 11. Positioning means 19 is disposed such that it is capable of positioning the open end of the inner spherical segment 18 so as to receive the influx of liquid and any entrained solids therein from vane 17. Slot means 21 disposed in the spherical segment 18 enables liquid passing over spherical segment 18 to pass through and out therefrom as the liquid is urged against the spherical segment by centrifugal force. The positioning means 19 also positions the inner spherical segment 18 so as to enable liquid exiting therefrom to pass to outlet conduit 14 of outer housing 11. Slot means 21 also is disposed such that it extends above the bottom of spherical segment 18 so as to enable solid material to settle in the bottom thereof.

Also included in the drain separator 10 is a threaded cleanout cap 22 which may be removed for cleaning out the spherical segment 18 and removing any particulate material, hair, vegetation and the like from the drain.

In the operation of the drain separator of the invention, waste fluid flows down inlet conduit 13 from a sink or basin and is spread into a fan as it wraps around the surface of inner spherical segment 18 which imparts a centripetal force thereto by its shape. Slot 21 which is curvilinear in nature permits any liquid to pass through and detains solid particulate material so as not to pass through the system. The solid or particulate material having a high degree of acceleration and directed force spins to the center of spherical segment 18, so resulting in the entrapment of the solids until such time as the device is opened for cleaning and removal of the entrapped solids. The annulus opening 23 below the slot 21 provides sufficient space for the fluid to discharge on course. Open areas 23 above and adjacent to inner spherical segment 18 provide an overflow path if clogging of the device occurs. It should be noted that the positioning of the inner spherical section 18 away from the outer spherical section 11 prevents clogging of the lower pipe and permits a significant overflow capacity should difficulties be encountered in the system.

If desired, deodorizing materials in the form of balls or rectangular configurations may be inserted in the inner spherical section of the separator, so facilitating the gradual release of a deodorant or other chemical designed to purify the atmosphere. Additionally, it may be advantageous to employ a chemical such as liquid plumber or other caustic material in solid form that would tend to debreed the area and/or consume vegetation contained therein. Alternatively, the spheres or rectangular materials employed for this purpose may be adapted with roughened surfaces so that they would tend to be tumbled or rotated by the force of the water as it passes through the spherical section, so resulting in the degradation and breakdown of any solid particles which may be entrapped therein.

It should be noted that this apparatus is positioned above the conventional trap and can be connected directly to the bottom of the sink basin or to a portion of drain pipe from the sink and provide a retrofit for the conventional plumbing system.

It is, therefore, evident that the described structure offers the industry an improved and simple means for capturing large solids combined with liquid waste that has been discharged into a waste line. The device is unique in design and separates liquid and solid through a natural centripetal force. Further, the internal design of the structure encourages a curvalinear motion which entraps the solids as the liquid waste is discharged.

Figure 2:
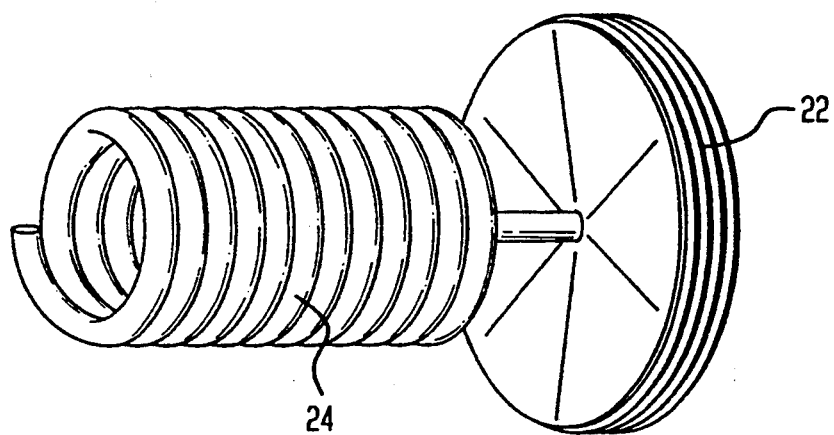
FIG. 2 is a perspective view of a cleanout cap adapted to be used in the drain separator of the invention.

With reference now to FIG. 2, there is shown a perspective view of a cleanout cap employed in the drain separator of the invention. Cap 22 comprises a screw threaded member which is connected to horizontal cylindrical section 16 of the drain separator. Cap 22, if desired, may be adapted with a coil spring 24 suitable for catching hair passing through the system or alternatively with a strainer.

Figure 3:
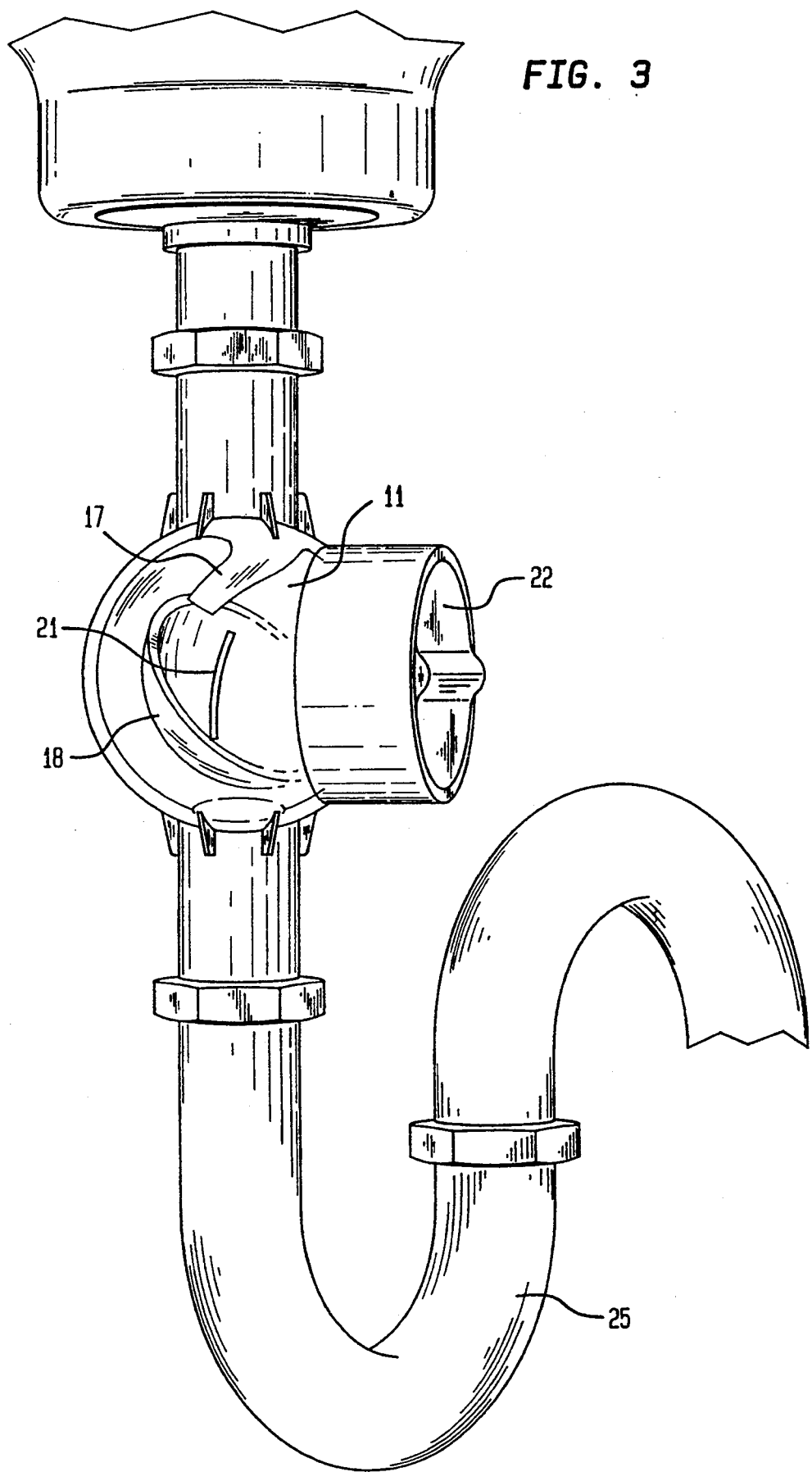
FIG. 3 is a perspective view of the drain separator of the present invention as adapted to an existing sink.

FIG. 3 is a simple perspective view of the drain separator of the invention shown adapted to an existing sink (not shown) and, a conventional sewer gas trap 25 commonly employed in the plumbing industry.

The described device may be used in residential applications, as for example, in kitchens, bathrooms and laundry areas. Alternatively, the filterless drain separator of the present invention can be used in commercial applications such as public buildings, in industrial locations having laboratories or in restaurants and public eating facilities in public restrooms. Clearly, this apparatus can have a wide range of applications in addition to the usual waste line applications.

It will be appreciated by those skilled in the art that only a few embodiments of the present invention have been illustrated and described. However, numerous variations may be made in the design and configuration of the filterless drain without departing from the spirit and scope of the invention as set forth in the appended claims.

What is claimed is:

1. A filterless drain separator comprising:
   A. a housing having:
      an inlet conduit;
      an outlet conduit;
      a spherical inner wall surface disposed between said inlet and outlet conduits;
      a vane disposed at said spherical inner wall and adapted to coact with said inlet conduit to direct liquid influx therefrom;
   B. a holding area within said housing, said holding area having:
      a spherical segment member disposed intermediate said inlet and outlet conduits of said housing;
      slot means disposed in said spherical segment member;
      wherein said spherical segment member is adapted to receive said liquid influx from said vane and urge said liquid influx by centripetal force to said slot means such that solid matter is separated from said liquid influx and detained at said holding area;
      positioning means coacting with said spherical segment member and at least one of said housing inner wall surface and said vane to position said spherical segment member to receive said liquid influx from said vane and direct said liquid influx from said holding area to said outlet conduit; and
   C. a cylindrical section connected to said housing and communicating with said holding area, said cylindrical section having:
      closure means removably mounted thereto, wherein said closure means permits access to said holding area; and
      screening means mountable to said closure means.

2. The filterless drain separator according to claim 1, wherein said closure means is a screw cap and said screening means is a coil spring.

3. The filterless drain separator according to claim 1, wherein said closure means is a screw cap and said screening means is a strainer.

4. The filterless drain separator according to claim 1, wherein said separator is formed from transparent material.

5. The filterless drain separator according to claim 1, further including deodorizing means disposed in said holding area at said spherical segment member to deodorize said solid matter and surrounding atmosphere.

6. The filterless drain separator according to claim 5, wherein said deodorizing means has roughened exterior surfaces to abrade said solid matter.

7. The filterless drain separator according to claim 1, wherein said inlet and outlet conduits are adapted with compression joints to fit said filterless drain separator to a drain pipe.

8. The filterless drain separator according to claim 1, wherein said spherical segment member is spaced from said spherical inner wall surface, said space providing a flow path to said outlet conduit when said slot means is obstructed.

9. A filterless drain separator comprising:
   A. a housing having:
      an inlet conduit;
      an outlet conduit;
      a spherical inner wall surface disposed between said inlet and outlet conduits;
      a turning vane disposed in said housing to coact with said inlet conduit to direct liquid influx therefrom;
   B. an inner holding area in said housing, including:
      a spherical segment member disposed intermediate said inlet and outlet conduits of said housing;
      slot means disposed in said spherical segment member;
      wherein said spherical segment member is adapted to receive said liquid influx from said turning vane and urge said liquid influx by centripetal force such that solid matter is separated from said liquid influx and detained at said inner holding area;
      positioning means disposed at said spherical segment member to position said spherical segment member to receive said liquid influx from said turning vane and direct said liquid influx to said outlet conduit; and
   C. a horizontal cylindrical section communicating with said spherical inner wall surface and having:
      a threaded screw cap removably mounted to said horizontal cylindrical section for accessing said inner holding area, said threaded screw cap including a coil spring extending to said inner holding area.

10. The filterless drain separator according to claim 9, wherein said housing is formed from transparent material.

11. The filterless drain separator according to claim 9, further including deodorizing means disposed at said spherical segment member to deodorize said solid matter and the atmosphere.

12. The filterless drain separator according to claim 11, wherein said deodorizing means has roughened exterior surfaces to abrade said solid matter.

13. The filterless drain separator according to claim 9, wherein said spherical segment member is spaced from said spherical inner wall surface of said housing, said space between said spherical segment member and said spherical inner wall surface providing a flow path to said outlet conduit when said slot means is obstructed.

14. A drain separator comprising:
a housing having an inlet, an outlet and an inner wall;
a spherical segment member disposed within said housing between said inlet and said outlet, spaced from said inner wall and having an inner wall surface, said spherical segment member arranged and shaped to impart curvilinear motion to liquid influx introduced at said inlet, wherein said liquid influx is urged by centripetal force such that particulate matter in said liquid influx settles on the inner wall surface of said spherical segment member;
a passage means disposed in said spherical segment member for providing a flow path through said spherical segment member to said outlet, said particulate matter being separated from said liquid influx and detained at said member; and
access means to provide access to the spherical segment member, said access means including a screw cap and a strainer.

15. The drain separator according to claim 14, further including flow directing means disposed at and coacting with said inlet to direct said liquid influx from said inlet to said spherical segment member.

16. The drain separator according to claim 14, further including means for positioning said spherical segment member, said positioning means coacting with said spherical segment member and at least one of said housing and flow directing means to position said spherical segment member to receive said liquid influx from said flow directing means and direct said liquid influx to said outlet.

17. The drain separator according to claim 14, wherein said space between said inner wall and said spherical segment member forms a second flow path to said outlet when said passage means is obstructed.

18. The drain separator according to claim 14, wherein said housing is formed from transparent material.

19. The drain separator according to claim 14, further including deodorizing means disposed at said spherical segment member to deodorize said particulate matter and the atmosphere.

20. The drain separator according to claim 19, wherein said deodorizing means has roughened exterior surfaces to abrade said particulate matter.

21. A drain separator comprising:
a housing having an inlet, an outlet and an inner wall;
a spherical segment member disposed within said housing between said inlet and said outlet, spaced from said inner wall and having an inner wall surface, said spherical segment member arranged and shaped to impart curvilinear motion to liquid influx introduced at said inlet, wherein said liquid influx is urged by centripetal force such that particulate matter in said liquid influx settles on the inner wall surface of said spherical segment member;
a passage means disposed in said spherical segment member for providing a flow path through said spherical segment member to said outlet, said particulate matter being separated from said liquid influx and detained at said member; and
access means to provide access to the spherical segment member, said access means including a screw cap and a coil spring.

22. A drain separator comprising:
a housing having an inlet, an outlet and an inner wall;
a spherical segment member disposed within the housing between the inlet and the outlet and spaced from the inner wall, the spherical segment member formed with a surface shaped and arranged to impart curvilinear motion to liquid influx introduced at the inlet to spread the liquid influx over the surface by centripetal force; and
passage means disposed in the spherical segment member to provide passage for the liquid influx from the surface through the spherical segment member to the outlet,
wherein particulate matter is separated from the liquid influx and settles on the surface of the spherical segment member where it is detained from entering the passage means.

23. The drain separator according to claim 22, wherein space between the inner wall and the spherical segment member forms a flow path to the outlet when the passage means is obstructed.

24. The drain separator according to claim 22, further including flow directing means disposed at and coacting with the inlet to direct the liquid influx from the inlet to the surface of the spherical segment member.

25. The drain separator according to claim 24, further including means for positioning the spherical segment member, the positioning means coacting with the spherical segment member and at least one of the housing and flow directing means to position the spherical segment member to receive the liquid influx from the flow directing means and direct the liquid influx onto the surface of the spherical segment member.

26. The drain separator according to claim 22, wherein the housing further includes means to access the spherical segment member.

27. The drain separator according to claim 26, wherein the access means includes means for straining the liquid influx.

28. The drain separator according to claim 26, wherein the access means includes a screw cap and a coil spring.

29. The drain separator according to claim 26, wherein the access means includes a screw cap and a strainer.

30. The drain separator according to claim 22, further including deodorizing means disposed at the surface of the spherical segment member to deodorize the particulate matter and the atmosphere.

31. The drain separator according to claim 30, wherein the deodorizing means has roughened exterior surfaces to abrade the particulate matter.

32. The drain separator according to claim 22, wherein the housing is formed from transparent material.

* * * * *